May 31, 1966  L. A. BOBULA ETAL  3,254,226

WORKPIECE MEASUREMENT APPARATUS

Filed Nov. 23, 1962  2 Sheets-Sheet 1

May 31, 1966     L. A. BOBULA ETAL     3,254,226
WORKPIECE MEASUREMENT APPARATUS

Filed Nov. 23, 1962     2 Sheets-Sheet 2

WITNESSES
Theodore F. Wrobel
Leon M. Garman

INVENTORS
Louis A. Bobula
Kirk A. Oplinger
BY
ATTORNEY

United States Patent Office 3,254,226
Patented May 31, 1966

3,254,226
WORKPIECE MEASUREMENT APPARATUS
Louis A. Bobula, Churchill, and Kirk A. Oplinger, Penn Hills, Pa., assignors to Westinghouse Electric Corporation, Pittsburgh, Pa., a corporation of Pennsylvania
Filed Nov. 23, 1962, Ser. No. 239,485
4 Claims. (Cl. 250—233)

The present invention relates in general to workpiece measurement apparatus and more particularly to apparatus for measuring at least one dimension of a workpiece in response to radiant energy from that workpiece.

It has been known in the prior art to measure a projected dimension image of a workpiece by a suitable and continuous scanning device such that the length of travel can provide an output signal proportional to the dimension. This has already been done to provide an infrared width measuring device utilizing the self-radiation of a heated workpiece such as a hot slab passing through a rolling mill to project an image of the slab or sheet at the surface of the scanning device.

If the workpiece is moving, the accuracy of the measurement will depend upon the speed of the scan which which requires a finite time interval as well as the speed of motion of the workpiece.

It is an object of the present invention to provide an improved workpiece measuring device which more accurately measures a desired dimension of the workpiece and is substantially less affected by the movement of the workpiece.

It is a different object to provide improved workpiece measuring apparatus which is responsive to radiation energy from the workpiece and requires less speed of response by a provided radiation detector since the speed and direction of the movement of the workpiece to be measured is less likely to affect the accuracy of the measurement.

In accordance with the teachings of the present invention, a non-contacting workpiece dimension measuring device is provided making use of radiant energy from the workpiece to project an image of the workpiece dimension onto a surface of a suitable scanning device. This scanning device may comprise an opaque rotating mask member positioned between the projected image of the workpiece and a radiation detector. Holes or radiation energy passages are provided in the mask member so that the holes pass or scan across the workpiece dimension in a path generally perpendicular to the dimension being measured, thus alternately exposing and isolating the radiation detector from the workpiece. A double and interweaved scan is provided each being from a respective outer edge of the workpiece dimension in a direction toward the center. A radiation detector generates a digital signal comprising an electrical signal each time a segment or elemental length of the workpiece is scanned, while those passages which do not scan the workpiece and are beyond the workpiece dimension to be measured will not produce a signal. The number of electrical signals provided by respective exposures of the radiation detector can be counted to provide a measure of the workpiece dimension that is measured. The resolution of the measurement is an inverse function of the predetermined length of the holes or passages in the direction of the strip dimension being measured. The workpiece dimension can accurately be determined in this manner.

These and other objects and advantages of the present invention will become apparent in view of the following description taken in conjunction with the drawings, wherein.

Figure 1:
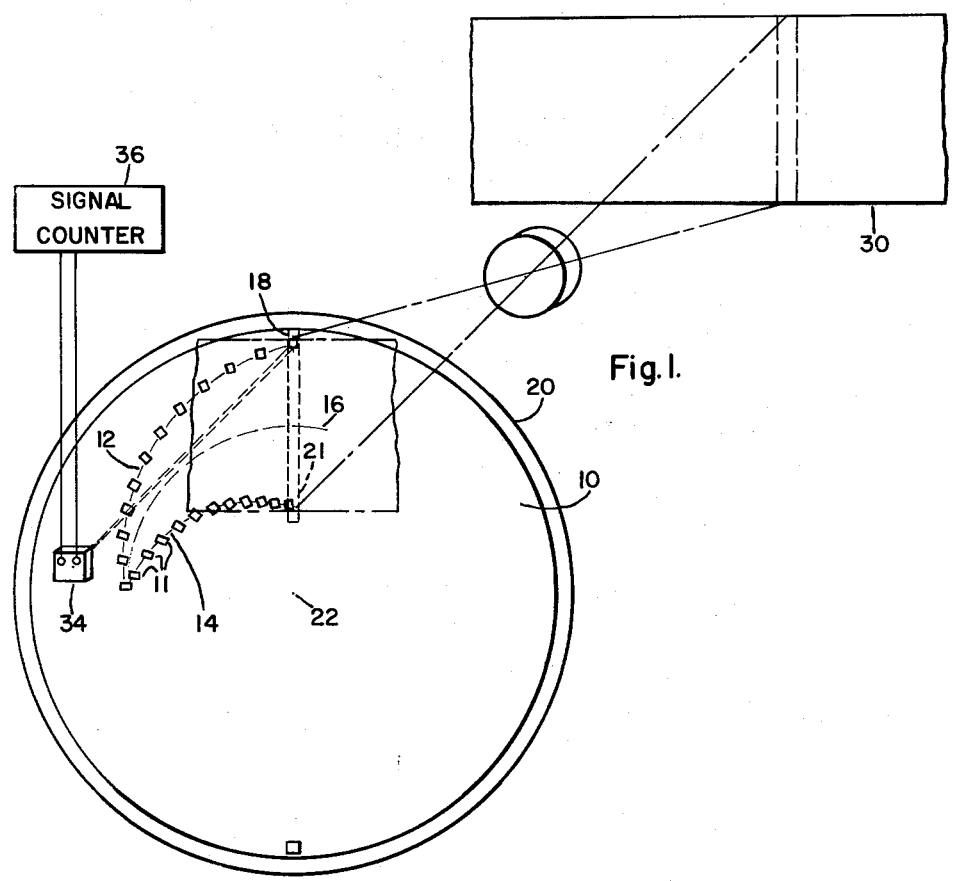
FIGURE 1 is an illustration of the present workpiece measurement apparatus including a rotating mask member positioned adjacent a stationary mask member.

In FIG. 1 there is shown a first rotatable mask member 10 having a plurality of holes or passages 11 arranged respectively in a first spiral path 12 and in a second spiral path 14 relative to the centerline 16 of an opening 18 in a stationary mask member 20. The first mask member 10 is rotatable about an axis 22, whereas the second mask member 20 is stationary in position relative to the axis 22. The projected workpiece image 21 is sequentially exposed along its whole length to an energy detector 34 operative with a signal counter 36.

Figure 2:
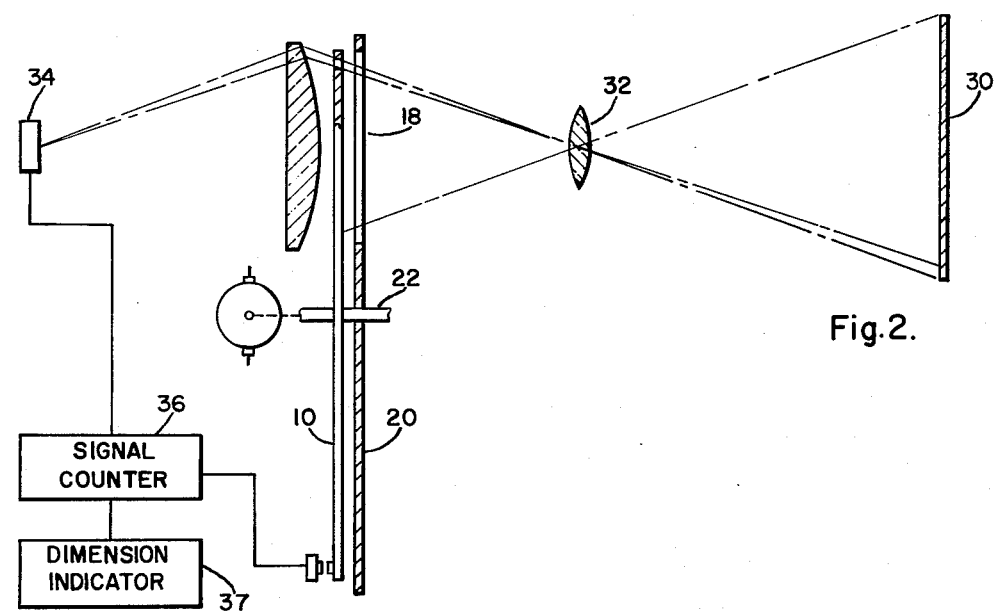
FIG. 2 is a schematic illustration of the workpiece and the resulting projected image operative with the two mask members and the radiation detector.

In FIG. 2 there is shown a side view of the first mask member 10 and the second mask member 20 relative to the axis 22, with the opening 18 in the second mask member 20 being shown. A workpiece 30 to be measured has its image projected through a lens system 32 and through the opening 18 in the second and stationary mask member 20 onto the plane of the first mask member 10, as illustrated in FIG. 2, such that as the mask member 10 is driven by the motor and rotates the plurality of holes provided in the first spiral path 12 and in the second spiral path 14 are sequentially aligned with the provided passage 18 in the stationary mask member 20 such that radiant energy from the workpiece 30 and passing through the lens system 32 is allowed to energize the radiation detector 34. In this respect, the radiation detector 34 may be an infra-red or hot metal detector device operative with the self-radiation from a heated workpiece 30, which would be the case of a hot slab or sheet of metal to be measured in cooperation with a rolling mill or the like. The output signals supplied to the signal counter 36 are totaled to operate a suitable dimension indicator 37. A magnetic pulse providing device 39 can be operative to correlate the rotation of the mask member 10 with the counting operation of counter 36.

Figure 3:
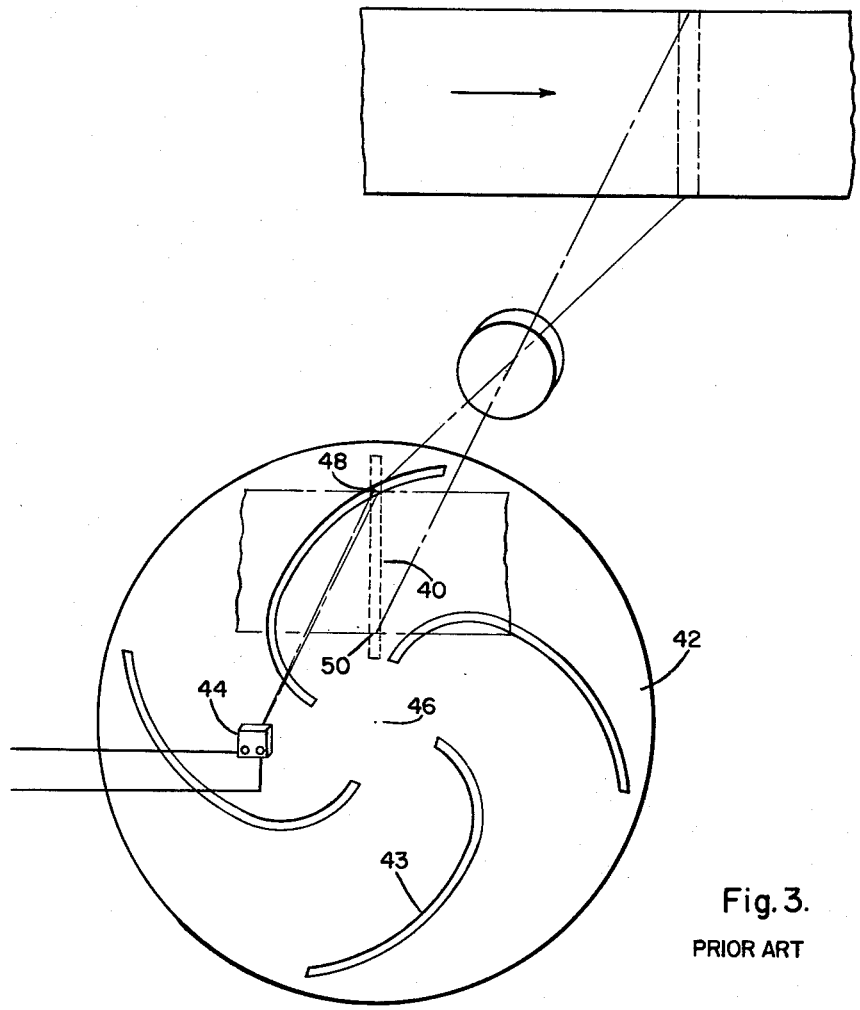
FIG. 3 is an illustration of a prior art workpiece dimension measurement device.

In FIG. 3, there is shown an illustration of a prior art device for measuring the dimension of a workpiece and operative to provide a projected image through a slot 40 onto the planar surface of a rotatable mask member 42. A radiation detector 44 is operative to integrate the length of travel time of the scanning aperture 43 to the radiant energy passing through the aperture 43 provided in the mask member 42 and arranged in a single spiral path, such that as the mask member 42 rotates about an axis 46 the radiation detector 44 is continuously exposed to radiation from the whole dimension of the workpiece such that in effect a scan is made from an upper end 48 of the workpiece dimension through the whole length of the workpiece to a lower end 50. The apparatus shown in FIG. 1 comprises an opaque and rotating disk or mask member 10 placed between the image 21 of the hot workpiece 30 and a radiation detector 34. The spirally arranged holes in the mask member 10 are operative such that they pass across the workpiece image 21 in a path substantially perpendicular to the workpiece dimension corresponding to the width of the image 21 shown in FIG. 1 and which is being measured to alternately expose and isolate the detector 34 from the radiation energy of the heated workpiece 30. A signal will be generated by the detector 34 each time a segment of the workpiece image 21 is scanned, while those holes which scan the area beyond the scanned dimension of the workpiece image 21 will not produce such an electrical signal. The number of such exposures of the detector 34 will be a measure of the length of the strip and it is only necessary to count the resulting electrical signals generated by the detector 34, knowing in advance the provided spacing between the scans across the workpiece image 21 by the respective holes provided in the mask member 10, to determine the actual length of the workpiece 30.

The resolution of such measurement will be an inverse function of the width dimension of the holes in the direction of the strip length being measured.

If the workpiece 30 is stationary, the measurement should be independent of the rotating speed of the scanning mask member.

In conventional steel mill practice, the workpiece 30 would probably be moving along a worktable, such that the finite time required for the scanning movement of the single scan mask member 42 shown in FIG. 3 to begin sensing radiant energy from a first extremity of the workpiece image and continue to the other extremity of the image might cause a serious error to be introduced depending upon the speed of motion of the workpiece 30. For example, in measuring the width on a continuous strip mill of a hot sheet passing through the rolling mill at a speed of 2400 feet per minute or 40 feet per second and using a scan rate of 40 scans per second, a measurement begun at one end of the sheet would not be completed directly across the sheet, but instead would be completed at a point farther down the sheet relative to the starting point. This problem becomes greater in measuring the length of steel plates in the direction of their motion on a reversing mill, since scanning in the same direction as the plate motion would give a reading higher than the actual length of the steel plate whereas a reverse scanning would result in a measured length shorter than the actual length of the steel plate.

One solution to the above problem would be to make the rotating speed of the mask member 42, and thereby the scanning speed, so high that it introduces a minimal error into the measurement during the time interval required to scan the work piece dimension. However, this imposes a severe requirement for speed of response on the radiation detector 44 which is not practically realizable.

In accordance with the teachings of the present invention, a double interweaved scan is provided by the measurement device shown in FIG. 1. Instead of a single scan from one extremity of the workpiece image to the other, two simultaneous scans are made from the respective outer edges of the workpiece or workpiece image to the center of the workpiece image. In this way, the critical and respective counts at the edges of the strip are made substantially simultaneously and before the sheet has had time to move an appreciable distance, while the counts in between can be made relatively unaffected by the motion of the strip. In addition, a plurality of holes or radiant energy passages are provided in the two spiral scans and arranged such that they interveave to provide a sequential and digital electrical signal by the radiation detector 34 shown in FIG. 2. The detector 34 is exposed alternately to a hole from one scan spiral and then to a hole in the other scan spiral and repetitively back and forth in this manner. The opening 18 provided in the stationary mask member 20 determines the strip area to be scanned and is usually fixed by the hole dimension in the tangential direction which in turn is fixed by limitations on the physical size and speed of the rotatable disk or mask member 10.

It is within the scope of this invention to provide the holes 11 for only a limited range of workpiece dimension variation. In other words, if the workpiece edges vary in position through a range of only six inches at either side, then a partial scanning spiral of holes 11 need be provided for each of the first spiral path 12 and the second spiral path 14 to correspond to this range of variation without continuing the scan through the remaining interior portion of the scanned dimension to reduce the time required to effect the desired measurement.

Also, the sensed energy can be reflected light energy or the like from a moving paper strip if desired, with a photocell being used to detect the light energy passing through the scanning holes 11. Also, fiber optic techniques can be used here if desired.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In a device for measuring a workpiece dimension, the combination of image providing means operative with said workpiece for providing an image of said workpiece dimension, an opaque mask member having a transparent opening shaped to correspond to said provided workpiece dimension image, scanning means including an opaque member operative with said mask member and having a plurality of transparent passages arranged into two sequential and alternately operative scanning arrays which respectively converge at a location on said opaque member approximately corresponding to the middle of said workpiece dimension image, and signal providing means responsive to energy from said provided workpiece dimension image and operative with said scanning means such that an output signal is provided by the signal providing means for each exposure to said provided image through one of said transparent passages alternately in one array and then in the other array in alignment with said opening.

2. In apparatus for measuring a dimension of a workpiece in response to radiant energy from said workpiece, the combination of signal providing means responsive to said radiant energy for providing an electrical signal, a first mask member having an opening substantially corresponding in shape to said workpiece dimension to be measured and permitting the passage of said radiant energy, a second mask member operative with said first mask member and containing a plurality of passages operative to sequentially register with said opening as one of the mask members is moved relative to the other mask member, with said plurality of passages being arranged in two spiral patterns which alternately register with said opening and converge toward the middle portion of said opening, said mask members being positioned between the signal providing means and the workpiece such that an electrical signal is provided for each exposure of the signal providing means to said radiant energy through one of said passages.

3. In a device for measuring a workpiece dimension, the combination of image projecting means operative with said workpiece for providing a radiation energy image of said workpiece dimension to be measured, an opaque mask member having an area transparent to said radiation energy and shaped to correspond to said workpiece dimension image and positioned to receive said provided image, scanning means including an opaque member rotatable relative to said mask member and having a plurality of transparent passages arranged into two sequential and alternately operative scanning arrays which respectively converge on said opaque mask member opening approximately corresponding to the middle of said provided dimension image, with each of said passages being thereby operative to scan across a different segment of the provided image substantially perpendicular to the dimension being measured and signal providing means responsive to said radiation energy from the workpiece and operative with said scanning means such that an output signal is provided by the signal providing means for each exposure to said radiation energy through one of said passages and said transparent area.

4. In a device for measuring a predetermined dimension of a workpiece which emits radiation energy, the combination of radiation image means operative with said workpiece for providing an image of said workpiece dimension, a non-transparent mask member having a transparent opening shaped to correspond in length to said workpiece dimension image, scanning means including a non-transparent member operative with said mask member and having a plurality of transparent passages arranged into two sequential and alternately exposed scanning arrays which respectively converge at a location on said mask member approximately corresponding to the middle of said workpiece dimension image, and signal providing means responsive to the radiation energy from said workpiece and operative with said scanning means such that sequential output signals are provided by the signal providing means for the respective exposures to said radiation energy of said signal providing means through one of said transparent passages from alternate arrays and in alignment with said opening.

References Cited by the Examiner

UNITED STATES PATENTS

| | | | |
|---|---|---|---|
| 1,880,295 | 10/1932 | Tate | 178—7.6 |
| 2,155,471 | 4/1939 | Cowley | 250—233 X |
| 2,674,915 | 4/1954 | Anderson | 88—14 |
| 2,674,917 | 4/1954 | Summerhayes | 250—219 |
| 2,791,931 | 5/1957 | Summerhayes | 250—219 |
| 2,892,948 | 6/1959 | Frantz | 250—202 |
| 2,975,293 | 3/1961 | Kruse et al. | 250—219 |
| 3,017,552 | 1/1962 | Brouwer | 250—219 |
| 3,093,742 | 1/1963 | Murphy | 250—233 X |

RALPH G. NILSON, *Primary Examiner.*

ARCHIE R. BORCHELT, *Examiner.*

E. STRICKLAND, J. D. WALL, *Assistant Examiners.*